United States Patent
Krenz

(10) Patent No.: US 11,482,958 B2
(45) Date of Patent: Oct. 25, 2022

(54) DUAL VOLTAGE LOW SPOOL GENERATOR

(71) Applicant: Hamilton Sundstrand Corporation, Charlotte, NC (US)

(72) Inventor: Michael Krenz, Roscoe, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/733,750

(22) Filed: Jan. 3, 2020

(65) Prior Publication Data
US 2021/0206501 A1 Jul. 8, 2021

(51) Int. Cl.
*H02P 9/00* (2006.01)
*H02P 9/30* (2006.01)
*H02P 101/30* (2015.01)

(52) U.S. Cl.
CPC .............. *H02P 9/307* (2013.01); *H02P 9/008* (2013.01); *B60L 2200/10* (2013.01); *H02P 2101/30* (2015.01)

(58) Field of Classification Search
CPC ...... H02P 9/307; H02P 9/008; H02P 2101/30; H02P 2101/25; B64D 31/06; B64D 27/16; B64D 41/00; B60L 50/10; B60L 2210/12; B60L 2210/14; B60L 2200/10
See application file for complete search history.

(56) References Cited

U.S. PATENT DOCUMENTS

| | | | |
|---|---|---|---|
| 6,825,640 B1 | 11/2004 | Hill et al. | |
| 7,622,817 B2 | 11/2009 | El-Refaie et al. | |
| 8,519,555 B2 * | 8/2013 | Dooley | B64D 41/00 290/1 A |
| 10,814,991 B2 * | 10/2020 | Shah | B64D 27/24 |
| 2012/0221157 A1 | 8/2012 | Finney et al. | |
| 2018/0006545 A1 * | 1/2018 | Fullmer | H02J 4/00 |
| 2019/0181786 A1 | 6/2019 | Singh et al. | |
| 2019/0280617 A1 * | 9/2019 | Lacaux | H02M 7/53871 |
| 2020/0385133 A1 * | 12/2020 | Ruhan | F02C 9/42 |

FOREIGN PATENT DOCUMENTS

EP 2458160 A2 5/2012

OTHER PUBLICATIONS

EP Search Report; dated May 11, 2021; Application No. 20217800.0; Filed: Dec. 30, 2020; 6 pages.

* cited by examiner

*Primary Examiner* — Julio C. Gonzalez
(74) *Attorney, Agent, or Firm* — Cantor Colburn LLP

(57) ABSTRACT

Systems and methods for dual voltage power generation are provided. Aspects include a generator having an input connected to an engine to receive rotational energy proportional to a rotation speed of a fan and having an output through which electrical energy is output, a rectifier circuit having an input coupled to the output of the generator and a rectifier output that outputs rectified power, a bypass switch connected to the output of rectifier and operates in a plurality of states including a normal operation state where the rectified power is provided a power converter and a bypass state where the rectified power is provided directly to a load, and a controller configured to determine an occurrence of an event associated with the engine, and operate the bypass switch in the bypass state based on the occurrence of the event associated with the engine.

15 Claims, 4 Drawing Sheets

DUAL VOLTAGE LOW SPOOL GENERATOR

BACKGROUND

The subject matter disclosed herein generally relates to aircraft components, and more particularly to a dual voltage low spool generator.

Aircraft may include power generation using turbines in main engines. However, as a safety feature, or for other reasons, alternate power device (e.g., supplementary or backup units) may be arranged on aircraft to supply power (e.g., electric and/or hydraulic) to components of the aircraft, when needed. For example, a ram air turbine is deployable to generate power when sufficient primary power generation is not available. The ram air turbine typically includes a turbine that is deployed into an airstream along (e.g., external to) the aircraft. Rotation of the turbine drives a generator and/or hydraulic pump. The generator and/or hydraulic pump can be mounted at a pivot point of the ram air turbine that is a distance from the turbine deployed within the airstream. Accordingly, a drive arrangement including a gearbox is utilized to transfer power from the turbine to the generator and/or hydraulic pump. The drive arrangement includes a gearbox that provides a desired speed and direction for driving the generator and/or hydraulic pump. Gears, shafts, and other drive components are constrained by limitations in the desired size, weight, and power generation of the ram air turbine. However, ram air turbine systems add significant weight and when deployed cause significant drag on the aircraft.

BRIEF DESCRIPTION

According to some embodiments, a system is provided. The system includes a generator having an input connected to an engine to receive rotational energy proportional to a rotation speed of a fan driven the engine and having an output through which electrical energy in output, a rectifier circuit having an input coupled to the output of the generator and a rectifier output that outputs rectified power, a bypass switch connected to the output of rectifier and configured to operate in a plurality of states, wherein the plurality of states includes a normal operation state where the rectified power is provided a power converter and a bypass state where the rectified power is provided directly to a load, and a controller configured to determine an occurrence of an event associated with the engine, and operate the bypass switch in the bypass state based on the occurrence of the event associated with the engine.

According to some embodiments, a method is provided. The method includes providing a generator having an input connected to an engine to receive rotational energy proportional to a rotation speed of a fan driven by the engine and having an output through which electrical energy is output, providing a rectifier circuit having an input coupled to the output of the generator and a rectifier output that outputs rectified power, providing a bypass switch connected to the output of rectifier and configured to operate in a plurality of states, wherein the plurality of states includes a normal operation state where the rectified power is provided a power converter and a bypass state where the rectified power is provided directly to a load, determining an occurrence of an event associated with the engine, and operating the bypass switch in the bypass state based on the occurrence of the event associated with the engine.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
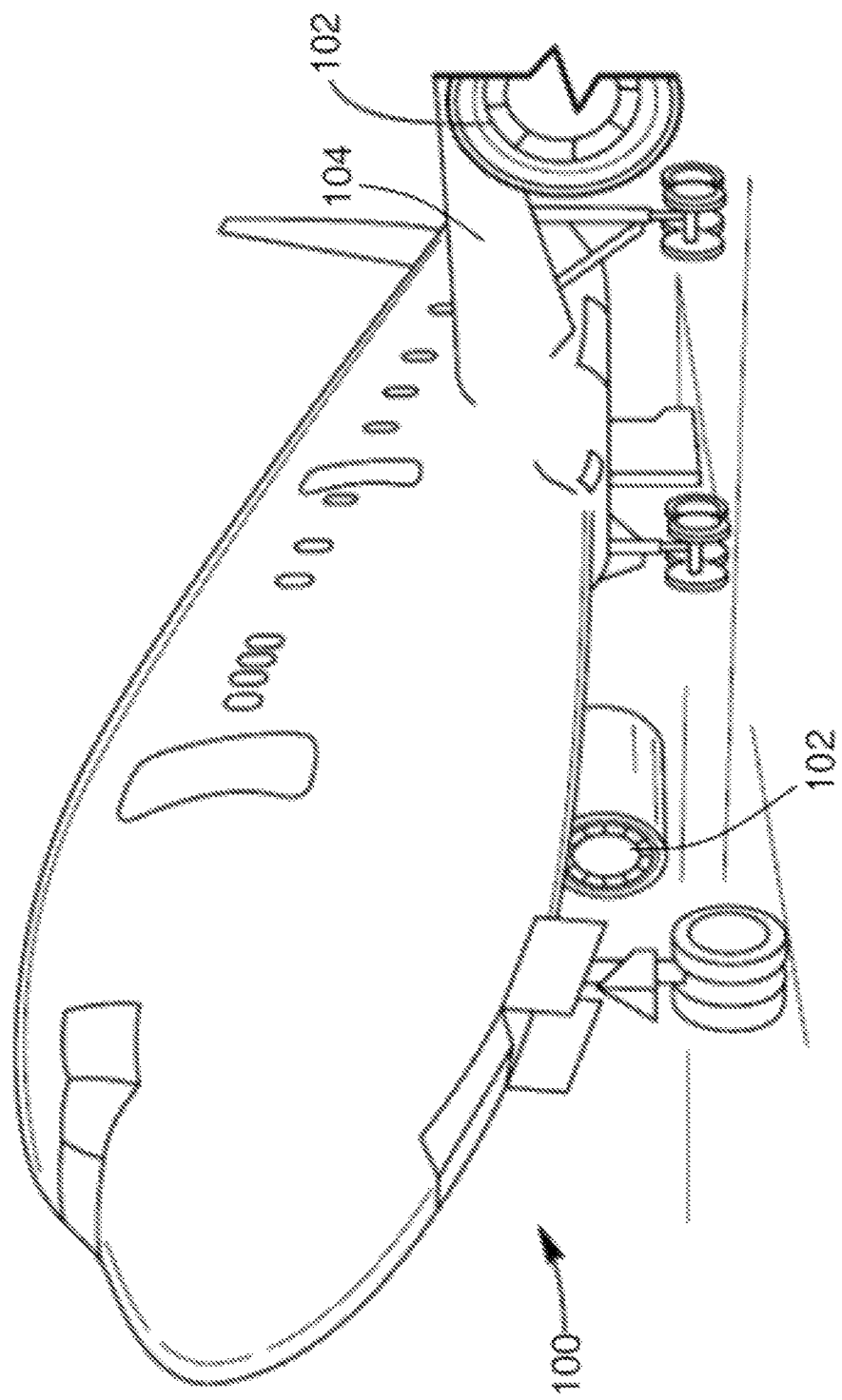
FIG. 1 depicts an aircraft according to one or more embodiments.

As shown in FIG. 1, an aircraft 100 typically includes one or more engines 102 for driving flight and powering the aircraft. The engines 102 are typically mounted on wings 104 of the aircraft 100, but may be located at other locations depending on the specific aircraft configuration. In some aircraft, the engine(s) may be tail mounted, or housed within the body of the aircraft, or otherwise arranged as will be appreciated by those of skill in the art.

Each engine 102 of the aircraft 100, regardless of location, may include one or more attached or connected generators, as appreciated by those of skill in the art. The generators may provide electrical power to various components of aircraft, as will be appreciated by those of skill in the art. In some configurations, the generators may be operably connected to an output shaft of the engine which drives a stator/rotor to generate electricity. In other configurations, a shaft from the engine may interface to a gearbox, and generators may be mounted, as an accessory, to the gearbox.

In addition to the power generated by the traditional or main engines (i.e., engines 102), additional power generation systems may be arranged on an aircraft. One type of such alternative, backup, or supplemental power generation may be a generator coupled to the low spool primary fan of the engines 102.

Turning now to an overview of technologies that are more specifically relevant to aspects of the disclosure, large, modern turbofan engines for aircraft include very large primary fan stages within the engine assembly. These fan stages typically operate in one of two speed ranges. These speed ranges include an active thrust speed where the engine fan is engaged and spinning at a high rate of speed. Another speed range includes a speed range referred to as wind milling when the engine has failed but the fan is still turning because the aircraft is still in flight. Aspects of the present disclosure provide for a generator coupled to the primary fan (sometimes referred to as the "low spool") that can serve in place of a ram air turbine (RAT) in a situation where the engine is in a wind milling speed range (i.e., when the engine has failed). During normal operations, the generator coupled to the primary fan generates a given normal operating voltage which typically is regulated by the magnetic field strength of a winding inside the generator. In a situation where the engine has failed, the speed of the primary fan drops significantly, but does not usually stop completely (i.e., wind milling).

Figure 2:
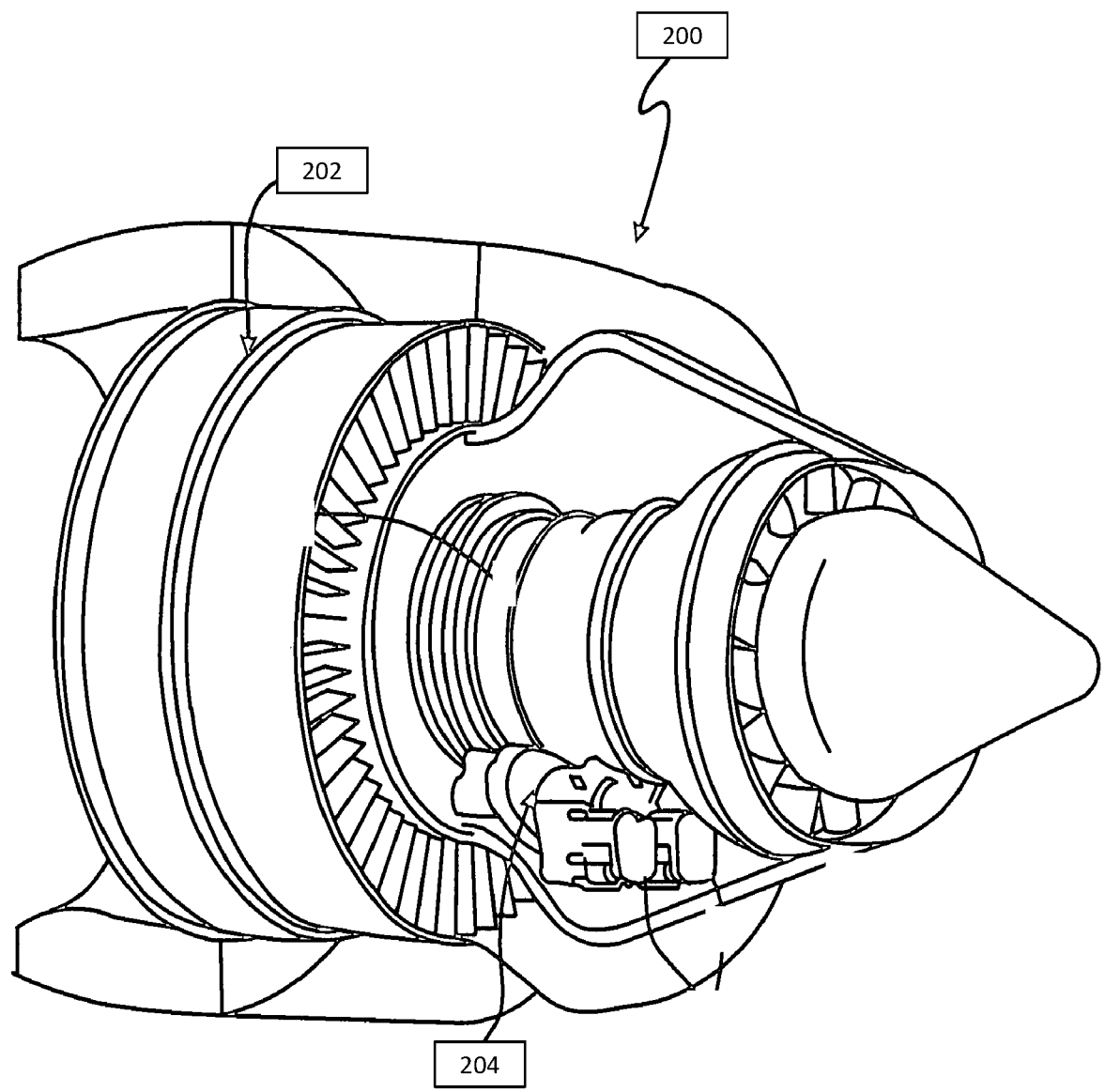
FIG. 2 depicts a diagram of an exemplary turbofan engine with a generator coupled to the low spool primary fan according to one or more embodiments.

In one or more embodiments, given the two speed ranges (e.g., normal operation and wind milling), a generator coupled to the low spool primary fan of a turbofan engine can provide two different voltage levels. FIG. 2 depicts a diagram of an exemplary turbofan engine with a generator coupled to the low spool primary fan according to one or more embodiments. The turbofan 200 is a type of airbreathing jet engine that is used in aircraft propulsion. The turbo portion refers to a gas turbine engine which achieves mechanical energy from combustion, and the fan, a ducted fan that uses the mechanical energy from the gas turbine to accelerate air rearwards. The turbofan engine 200 includes a low spool primary fan 202 with airfoils (e.g., blades) that facilitate movement of air through the engine 200. In addition, the airfoils can rotate responsive to airflow in the event that the aircraft is moving but the engine 200 is no longer working. The turbofan engine 200 also includes a gearbox 204 that can transmit power from the fan 202 to a generator within the gearbox 204. In one or more embodiments, the gearbox 204 of the engine 200 is configured to receive and transmit rotation from the low spool primary fan 202 to a drive shaft. For example, the gearbox 204 may be configured to receive a turbine shaft driven by the rotation of the low spool primary fan 202 at a rotational velocity and convert the rotation to a different speed drive shaft rotation velocity. This drive shaft can be operably connected to the generator to generate power. The gear set within the gearbox 204 may provide increased or decreased rotational speeds for the generator depending on the specific application.

Figure 3:
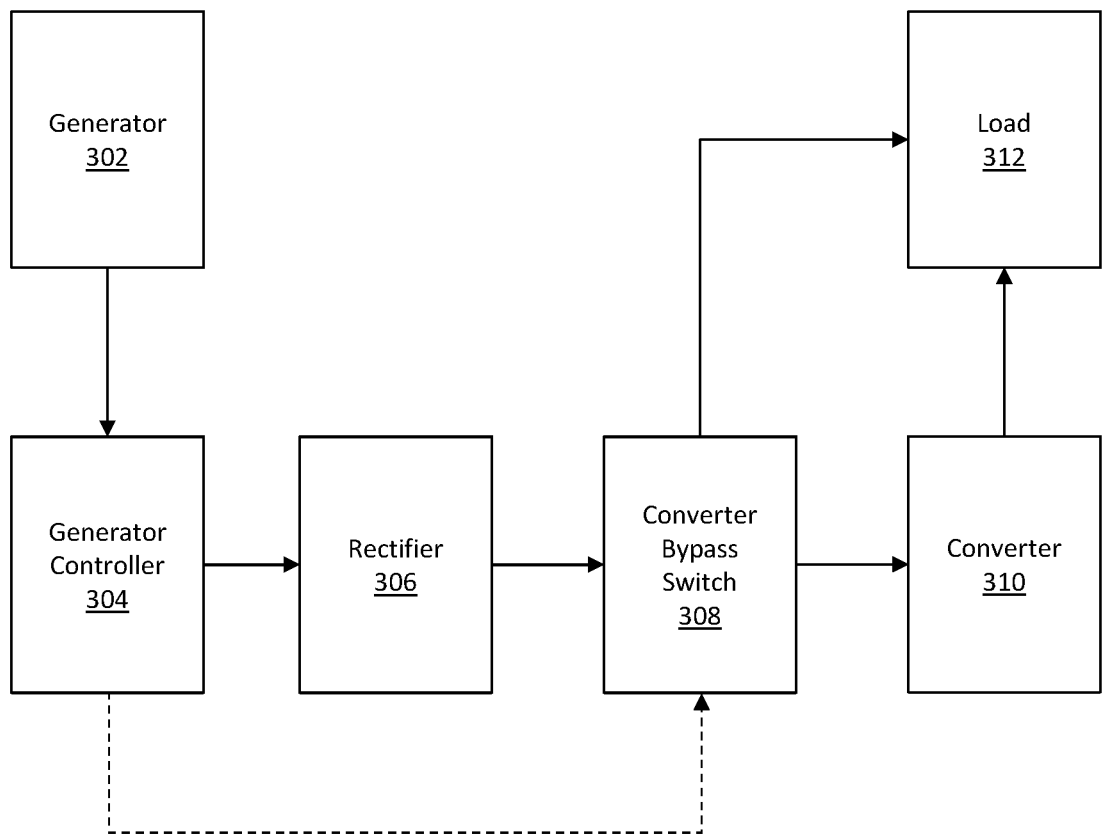
FIG. 3 depicts a system for dual voltage generation in an aircraft according to one or more embodiments.

FIG. 3 depicts a system for dual voltage generation in an aircraft according to one or more embodiments. The system 300 includes a generator 302 which can be the generator operably connected to the low spool primary fan 202 (from FIG. 2) and operated as described above to receive rotational speed from the fan 202. The system 300 also includes a generator controller 304, a rectifier 306, a converter bypass switch 308, a power converter 310, and a load 312 being driven by the generator 302. The rectifier 306 is electrical device that converts alternating current (AC), which periodically reverses direction, to direct current (DC), which flows in only one direction. The rectifier 306 can be any type of rectifier configuration including, but not limited to, half bridge or full bridge rectifier circuits. The rectifier 306 is configured to convert the AC voltage from the generator to a DC voltage to drive the load 312. The output of the rectifier 306 is coupled to the converter bypass switch 308 which is controlled and operated by the generator controller 304. The converter bypass switch 308 is operable to either pass the DC voltage directly to the load 312 or though a converter 310 connected to the load 312. As described in greater detail below, the generator controller 304 operates the converter bypass switch 308 to either supply voltage to the converter 310 or bypass the converter 310 and supply voltage directly to the load 310. In one or more embodiments, the converter 310 is a DC-to-DC step down converter which takes in a DC voltage and steps down (i.e., lowers) the voltage at the output of the converter 310.

In one or more embodiments, the system 300 operates through the generator controller 304 to supply two different voltage levels to the load 312 depending on the operational state of the engine. When the engine is operating, and the fan is spinning faster (e.g., 1500-1700 RPM), the generator 302 is regulated to produce a higher voltage (e.g., 270V DC at the output of the rectifier 306 or 115V AC from the generator 302). However, if the engine fails, the low spool primary fan continues to spin due to the ram air pressure as the fan is still in the slip stream of the aircraft. During engine failure, the low spool primary fan is spinning at a lower speed (nominally $\frac{1}{10}^{th}$ of the speed during normal operation), also called wind milling. During wind milling, the generator 302 is regulated to a lower voltage (28V DC at the output of the rectifier 306 or 12V AC from the generator. The speed ratio can vary by engine type and also how fast the aircraft is travelling. The generator controller 304 can determine the operational mode of the engine (normal vs. wind milling) based on the speed of the fan and/or as reported by the engine. The full authority digital engine control (FADEC) system can report on the status of the engine. Also, the voltage of the generator 302 is continuously monitored. In one or more embodiments, the load 312 can require a 28V DC voltage and the converter 310 is a DC/DC converter that is configured to step down the 270V DC voltage from the rectifier 306 to a 28V DC voltage. During normal operation of the engine, the low spool primary fan is spinning at a high rate causing the generator 302 to produce a rectified voltage of 270V. The converter bypass switch 308 is operated by the generator controller 304 to allow the rectified voltage of 270V to be inputted into the converter 310. The output of the converter 310 is the stepped down voltage of 28V and is used to drive the load 312. During wind milling (i.e., engine failure), the low spool primary fan is spinning at a slower rate ($\frac{1}{10}^{th}$) causing the generator 302 to produce a rectified voltage of 28V. The converter bypass switch 308 can be operated by the generator controller 304 to provide the rectified voltage of 28V directly to the load 312. In one or more embodiments, the generator controller 304 can operate the bypass switch 308 based on the rotational speed of the fan in the engine by defining a threshold speed for operation. Should the rotational speed of the fan drop below the threshold speed, the generator controller 304 can operate the converter bypass switch 308 in a bypass state where the output of the rectifier 306 is connected directly to the load 312. And if the rotational speed of the fan remains above the threshold speed (e.g., normal operation state), the generator controller 304 can operate the converter bypass switch 308 in the normal operation state by connecting the output of the rectifier 306 to the input of the converter 310 allowing the rectified voltage to be stepped down for the load 312. In one or more embodiments, the generator 302 can be a wound field generator. The output voltage of a wound field generator may be controlled by modulating the strength of the magnetic field in the generator. The generator controller 304 uses energy from a small permanent magnet generator on the same shaft as the main generator to modulate the magnetic field of the main generator 302 (the more excitation of the field, and the faster the generator is spinning, the higher the generated voltage). The generator controller 304 can control the field to generate the higher voltage during the higher speed operational range of the engine. When the engine speed is not high enough, then the generator controller 304 will control the field to generate the lower voltage.

In one or more embodiments, the load 312 can require a 270V DC voltage for operation and the converter 310 is a boost converter that steps up the 28V DC voltage from the rectifier 306 to a 270V DC voltage. During normal operation of the engine, the low spool primary fan is spinning at a high rate causing the generator 302 to produce a rectified voltage of 270V. The converter bypass switch 308 is operated by the generator controller 304 to provide the rectified voltage of 270V directly to the load 312. During wind milling (i.e., engine failure), the low spool primary fan is spinning at a slower rate ($1/10^{th}$) causing the generator 302 to produce a rectified voltage of 28V. The converter bypass switch 308 can be operated by the generator controller 304 to allow the rectified voltage of 28V to be inputted into the converter 310. The output of the converter 310 is the stepped up voltage of 270V and is used to drive the load 312.

In one or more embodiments, the rectifier 306 can be optional based on the load 312. The load 312 can be an AC load that would not require rectification of the AC voltage coming from the generator 302. With an AC load as the load 312, the converter 310 can be an AC/AC converter that is configured to either step up (boost) or step down the voltage based on the load 312 requirements.

As will be appreciated by those of skill in the art, the system described herein can provide power (e.g., electric) to one or more aircraft components. For example, without limitation, aircraft components that can be powered by the system described herein can include airfoil actuators, ailerons and other flight control surfaces (flaps, slats, etc.), and electrical and/or electronic components, including, but not limited to flight-critical instrumentation, navigation, heaters, and/or communication equipment.

In one or more embodiments, the generator controller 304 or any of the hardware referenced in the system 300 can be implemented by executable instructions and/or circuitry such as a processing circuit and memory. The processing circuit can be embodied in any type of central processing unit (CPU), including a microprocessor, a digital signal processor (DSP), a microcontroller, an application specific integrated circuit (ASIC), a field programmable gate array (FPGA), or the like. Also, in embodiments, the memory may include random access memory (RAM), read only memory (ROM), or other electronic, optical, magnetic, or any other computer readable medium onto which is stored data and algorithms as executable instructions in a non-transitory form.

In one or more embodiments, the converter bypass switch 308 can be any type of switch including a one output switch, a two output switch, a combination of switches that allows for operation such that the voltage can flow in one of two directions (e.g., to the load 312 directly or to the converter 310)

Figure 4:
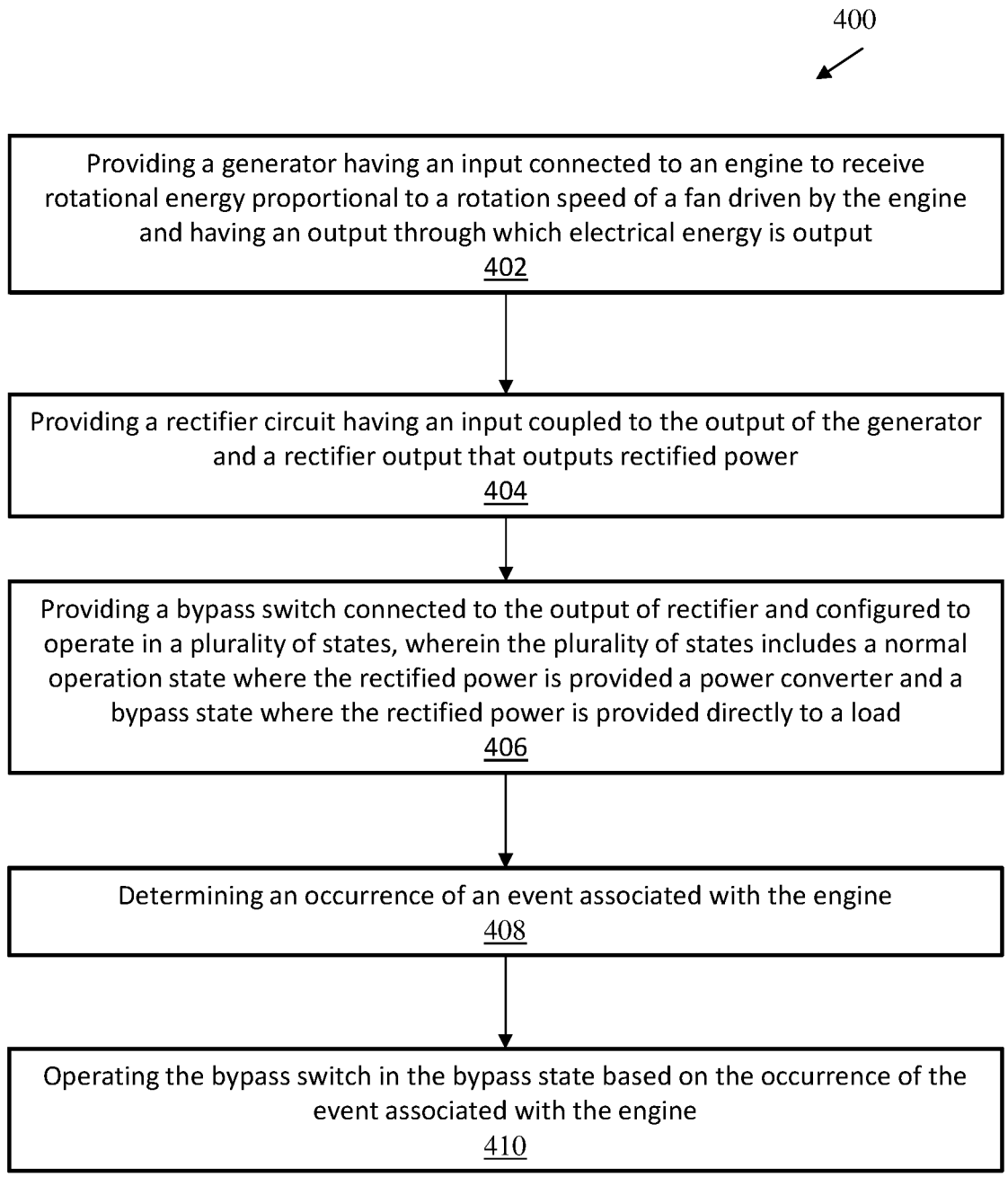
FIG. 4 depicts a method for operating a dual voltage generator in an aircraft according to one or more embodiments.

FIG. 4 depicts a flow diagram of a method for dual voltage power generation according to one or more embodiments of the invention. The method 400 includes providing a generator having an input connected to an engine to receive rotational energy proportional to a rotation speed of a fan driven by the engine and having an output through which electrical energy is output, as shown in block 402. At block 404, the method 400 includes providing a rectifier circuit having an input coupled to the output of the generator and a rectifier output that outputs rectified power. The method 400, at block 406, includes providing a bypass switch connected to the output of rectifier and configured to operate in a plurality of states, wherein the plurality of states includes a normal operation state where the rectified power is provided a power converter and a bypass state where the rectified power is provided directly to a load. The method 400 also includes determining an occurrence of an event associated with the engine, as shown at block 408. And at block 410, the method 400 includes operating the bypass switch in the bypass state based on the occurrence of the event associated with the engine.

Additional processes may also be included. It should be understood that the processes depicted in FIG. 4 represent illustrations, and that other processes may be added or existing processes may be removed, modified, or rearranged without departing from the scope and spirit of the present disclosure.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system comprising:
a generator having an input connected to an engine to receive rotational energy proportional to a rotation speed of a low spool fan driven by the engine and having an output through which electrical energy is output;
a rectifier circuit having an input coupled to the output of the generator and a rectifier output that outputs rectified power;
a bypass switch connected to the output of rectifier and configured to operate in a plurality of states, wherein the plurality of states comprises a normal operation state where the rectified power is provided directly to an input of a power converter and a bypass state where the rectified power is provided directly to a load;
a controller configured to:
determine an occurrence of an event associated with the engine; and
operate the bypass switch in the bypass state based on the occurrence of the event associated with the engine, wherein the occurrence of the event comprises a failure of the engine causing the rotational speed of the low spool fan being below a threshold rotational speed, wherein the controller determines the failure of the engine based on a notification from a full authority digital engine control (FADEC) system; and wherein the controller is further configured to:
operate the bypass switch in the normal operation state based at least in part on a determination that the rotational speed of the low spool fan exceeds a threshold rotational speed, wherein the normal operation state comprises a first output voltage of the power converter, wherein the bypass state comprises a second output voltage of the power converter, wherein the first output voltage is an order of magnitude higher than the second output voltage.

2. The system of claim 1, wherein an output of the power converter is connected to the load.

3. The system of claim 1, wherein the power converter comprises a step-down converter.

4. The system of claim 1, wherein the power converter comprises a boost converter.

5. The system of claim 1, wherein the engine comprises a turbofan engine.

6. The system of claim 1, wherein the fan comprises a low spool primary fan in a turbofan engine.

7. The system of claim 1, wherein the load comprises at least one of an airfoil actuator, a flight-critical instrument, navigation instrument, heater, and communication equipment.

8. A method for dual voltage power generation, the method comprising:
providing a generator having an input connected to an engine to receive rotational energy proportional to a rotation speed of a low spool fan driven by the engine and having an output through which electrical energy is output;
providing a rectifier circuit having an input coupled to the output of the generator and a rectifier output that outputs rectified power;
providing a bypass switch connected to the output of rectifier and configured to operate in a plurality of states, wherein the plurality of states comprises a normal operation state where the rectified power is provided directly to an input of a power converter and a bypass state where the rectified power is provided directly to a load;
determining an occurrence of an event associated with the engine; and
operating the bypass switch in the bypass state based on the occurrence of the event associated with the engine, wherein the occurrence of the event comprises a failure of the engine causing the rotational speed of the low spool fan being below a threshold rotational speed, wherein the determining the failure of the engine is based on a notification from a full authority digital engine control (FADEC) system;
operating the bypass switch in the normal operation state based at least in part on a determination that the rotational speed of the low spool fan exceeds a threshold rotational speed, wherein the normal operation state comprises a first output voltage of the power converter, wherein the bypass state comprises a second output voltage of the power converter, wherein the first output voltage is an order of magnitude higher than the second output voltage.

9. The method of claim 8, wherein operating the bypass switch in the bypass state comprises connecting the output of the rectifier circuit to a load.

10. The method of claim 8, wherein operating the bypass switch in the normal operation state comprises connecting an output of the rectifier circuit to an input of a power converter.

11. The method of claim 8, wherein the power converter comprises a step-down converter.

12. The method of claim 8, wherein the power converter comprises a boost converter.

13. The method of claim 8, wherein the engine comprises a turbofan engine.

14. The method of claim 8, wherein the fan comprises a low spool primary fan in a turbofan engine.

15. The method of claim 8, wherein the load comprises at least one of an airfoil actuator, a flight-critical instrument, navigation instrument, heater, and communication equipment.

* * * * *